United States Patent [19]

Seiple

[11] 3,753,422
[45] Aug. 21, 1973

[54] MARINE MAMMAL AUTOMATIC FLOAT LOCATING AND RESTRAINING DEVICE AND METHOD

[75] Inventor: Ronald L. Seiple, Kailua, Hawaii

[73] Assignee: The United States of America as represented by the Secretary of the Navy

[22] Filed: June 26, 1972

[21] Appl. No.: 266,086

[52] U.S. Cl. .................................................. 119/29
[51] Int. Cl. .......................................... A01k 15/00
[58] Field of Search ................... 119/29, 1; 43/6, 43/23, 25; 9/9

[56] References Cited
UNITED STATES PATENTS
1,476,387   12/1923   Atwell ........................................ 9/9
2,675,568   4/1954   King ........................................... 9/9
2,903,718   9/1959   Wright, Jr. .................................. 9/9

Primary Examiner—Hugh R. Chamblee
Attorney—Richard S. Sciascia et al.

[57] ABSTRACT

A device useful in training marine mammals is disclosed as having an inflatable bladder which, when inflated, increases the hydrodynamic drag and buoyancy of the marine mammal. The device is characterized by having an inactive position having low hydrodynamic drag and negative buoyancy and an activated position which has a relatively high hydrodynamic drag and positive buoyancy. A source of gas under pressure, for example a gas cartridge, is connected so as to inflate the bladder means upon a predetermined interval of exposure to salt water. The inflation of the bladder is controlled by a water soluble washer which restrains a spring loaded plunger from penetrating the gas filled cartridge.

11 Claims, 6 Drawing Figures

PATENTED AUG 21 1973 3,753,422

MARINE MAMMAL AUTOMATIC FLOAT LOCATING AND RESTRAINING DEVICE AND METHOD

STATEMENT OF GOVERNMENT INTEREST

The invention described herein may be manufactured and used by or for the Government of the United States of America for governmental purposes without the payment of any royalties thereon or therefor.

1. Field of the Invention

This invention pertains to the field of animal husbandry. More particularly, this invention pertains to a device and method for training animals to respond to human direction. In still greater particularity, this invention pertains to a device and method for the training of marine mammals. By way of further explanation, but not by means of limitation thereto, this invention describes a training device and method for the training of aquatic mammals such as the California sea lion.

2. Description of the Prior Art

The training of animals to do the bidding of mankind is an ancient and well practiced art. However, it has only been in recent times that man has attempted to train aquatic mammals to do his bidding. The high order of intelligence of these animals and their excellent aquatic abilities of swimming, diving, and navigating make them especially suited for retrieval of objects from the floor of the sea, locating submerged objects, and acting as couriers between surface personnel and personnel engaged in underwater activities. Because of the relatively recent emergence of this branch of the ancient science of animal training, most of the specimens which are trained are captured from the wild state and domesticated as opposed to the typical terrestrial domesticated animal which is born to the domestic state.

Because of man's limited mobility in and on the water and his incomplete understanding of the habits of such marine mammals, this capture and training process requires the expenditure of considerable time and effort. Typically, a young animal is captured and transferred from the sea to enclosures where he is exposed to and encouraged to work with his trainer. After the completion of this first training period, the trainer takes the animal to the open sea for further training. At this critical phase of the animal's training it sometimes happens that the animal does not return to its trainer after completing a task but resumes its natural habits of exploring and foraging in the sea. Because of the time and effort expended in the training of the animal to that point, as well as the considerations of the animal survival while wearing such training apparatus as harnesses and muzzles, the recovery of such animals is of utmost importance. Attempts to restrict the animal's mobility by the use of floats or lines attached thereto have proven less than successful because of their interferrence with the desired movements of the animal.

SUMMARY OF THE INVENTION

This invention solves the problem of animal recovery long unsolved in the prior art by equipping the aquatic mammal with a small, lightweight, mechanically simple, and rugged device which, in its passive state, offers little or no restriction to the animals normal movements. After a predetermined exposure to salt water, however, the device of the invention inflates to provide a large buoyant float having a high hydrodynamic drag. The effect of this inflation is to restrict the animal's movements to the surface of the water and visually mark him thereby greatly facilitating the recapture of the semi-trained mammal. This inflated device additionally induces an uncomfortable state in the mind of the marine mammal and he quickly learns that if he returns to his trainer where the device may be replaced with a fresh one, he may avoid this unpleasant experience. The invention has, therefore, greatly facilitated the domestication of these very useful animals.

STATEMENT OF THE OBJECTS OF INVENTION

It is accordingly an object of this invention to provide a device and method for the training of marine mammals.

It is a further object of this invention to provide a device to be carried by a marine mammal undergoing training which, after a predetermined time interval, increases the marine mammal's buoyancy and hydrodynamic drag.

Another object of this invention is to provide an inflatable marine mammal locating and restraining device and a method for employing this device.

Still another object of this invention is to provide an inflatable marking device and mammal restraining device which is self inflating after a predetermined interval of exposure to seawater.

These and other objects of the invention will become more readily apparent from the ensuing specification when taken with the drawings.

DESCRIPTION OF THE PREFERRED EMBODIMENT

Figure 1:
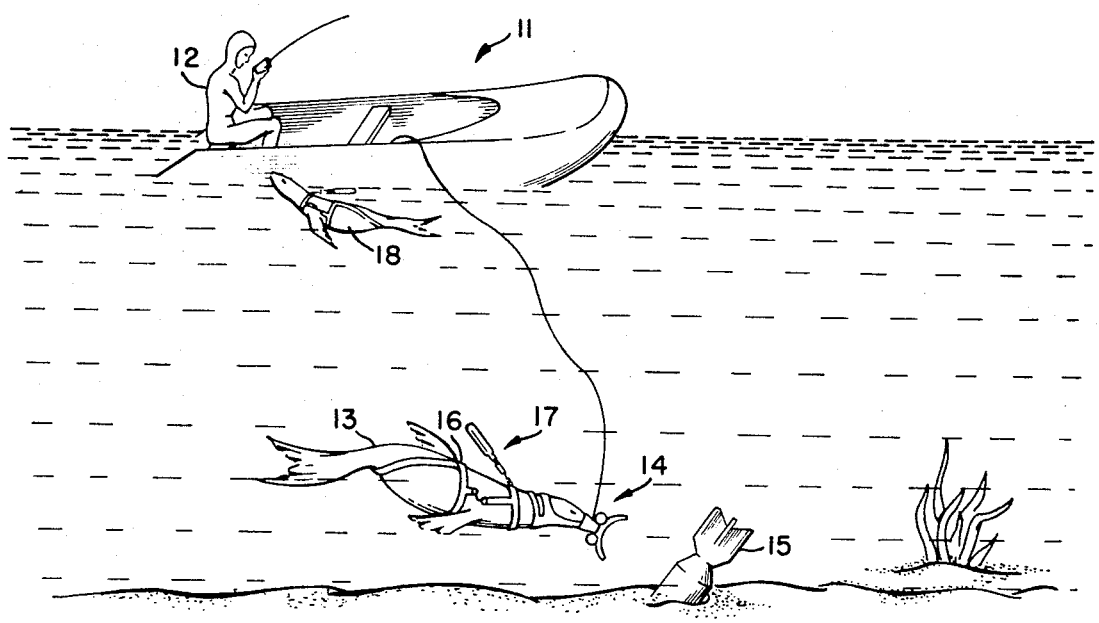
FIG. 1 is a diagramatic representation of the device of the invention in use by a trainer and marine mammals according to the invention.

Referring to FIG. 1, an inflatable surface craft 11 is shown as an operational platform for a trainer 12 engaged in training marine mammals, for example, a sea lion 13. In the illustrated exercise, sea lion 13 is placing a recovery tool 14 on a submerged object 15. Of course, it will be realized that this is an exemplary illustration shown for purposes of explanation and, in fact, sea lion 13 may perform a variety of tasks.

Sea lion 13 is wearing a harness 16 having a training device 17 attached thereto. Harness 16 may be made of any suitable material such as fabric webbing or leather. Training device 17 is attached to harness 16 by means of a suitable clasp means, not shown, and is free to stream behind sea lion 13 as the animal moves through the water. In the illustration, a second sea lion 18 is shown having returned to trainer 12 who is seated in inflatable craft 11. Quite naturally, any suitable surface vessel may be used as a training platform, however, it has been found that the inflatable type vessels are conveniently deployed by a minimum of personnel and greatly reduce the chance of injury to the animals being trained.

Figure 2:
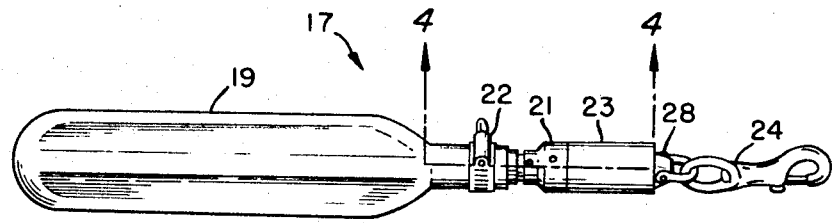
FIG. 2 is a perspective view of the training device according to the invention removed from the marine mammal's harness.

Referring to FIG. 2, training device 17 is shown separated from harness 16. Suitable bladder means, such as a fluted balloon 19, is attached to the body means, indicated generally at 21, by means of a suitable clamp 22. Fluted balloon 19 is made of a heavy guage elastic material and when deflated the fluting keeps the balloon in an elongated, generally cylindrical configuration. The end of body means 21 remote from fluted balloon 19 is closed by a suitable threaded end cap 23. Attachment of the training device 17 to harness 16 is made possible by a suitable clasp means such as a conventional swivel clasp 24.

Body means 21 is made of a lightweight nylon material which, aside from its high strength, affords a very light weight to the completed device. Swivel clasp 24 is a standard marine hardware item and is constructed of brass or stainless steel. Fluted balloon 19, on the other hand, is a special design made for fast inflation and freedom from freezing although in some applications the standard item, originally intended for meteorological applications and children's toys, may be employed. Clamp 22 is also a standard hardware item and is made of steel and has a screw type clamping mechanism. Of course, other standard hardware items may be used for clamp 22 as well as clasp 24 if desired.

Figure 3:
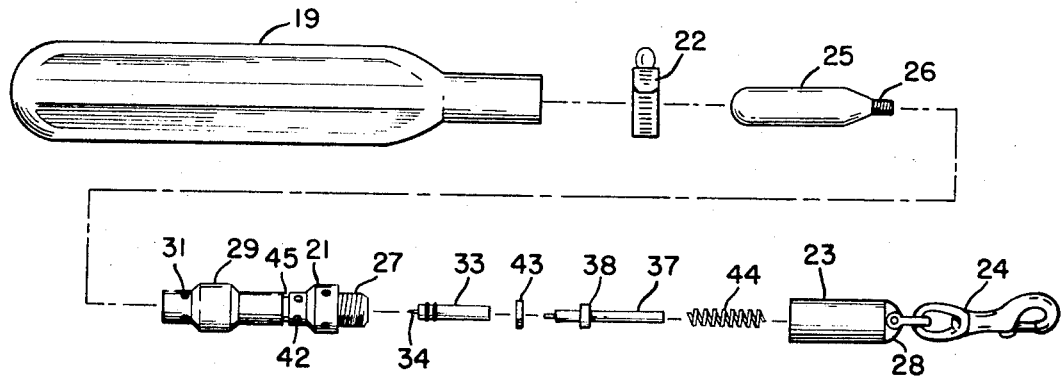
FIG. 3 is an exploded view of the device of FIG. 2.
Figure 4:
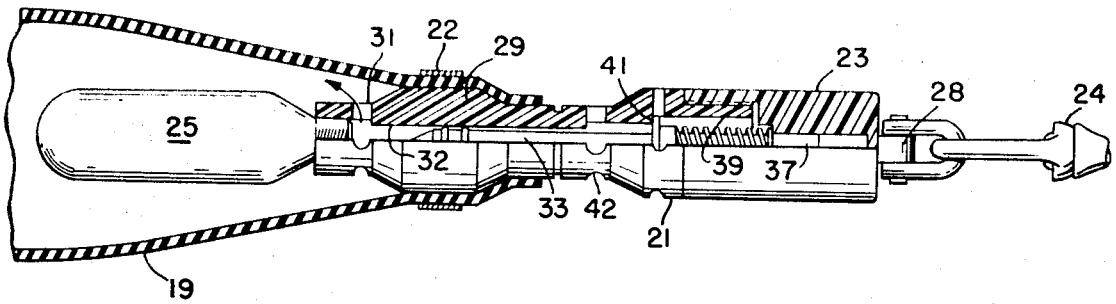
FIG. 4 is a partial sectional view taken along lines 4—4 of FIG. 2.

Referring now to FIGS. 3 and 4, which for purposes of convenience will be discussed together, the working mechanism of the device of the invention will be apparent. A suitably dimensioned gas cartridge 25 is threaded by means of threads 26 on the one end thereof, into one end of body means 21, which is internally threaded to receive gas cartridge 25. The opposite end of body means 21 is externally threaded, as shown at 27, so as to receive cap 23. End cap 23 has a suitably shaped boss 28 extending in an axial direction from the end thereof so as to support swivel clasp 24 thereon. As shown in FIG. 4, gas cylinder 25 extends into the interior of fluted balloon 19. When training device 17 is assembled, fluted balloon 19 is drawn over the end of body means 21 and is secured to an enlarged flange 29 to form an airtight seal therewith. As previously noted, a suitable clamp 22 secures the neck of fluted balloon 19 about enlarged flange 29.

It will be seen that suitable vents 31 are circumferentially spaced about body means 21 so as to be located on the inside of fluted balloon 19. Of course, vents 31 are positioned to permit the passage of the inflating gas from cartridge 25 into fluted balloon 19. A small bore 32 extends through body member 21 so as to communicate with the end of gas cartridge 25 when it is threadably mounted on body means 21. The release of the gas from gas cartridge 25 is accomplished by means of a plunger 33 which slides within bore 32.

Figure 5:
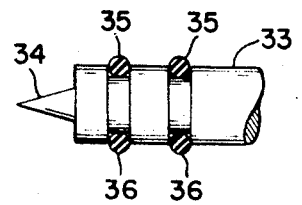
FIG. 5 is a plan view of the plunger used in the invention.

Referring now to FIG. 5, it may be seen that plunger 33 is terminated by a sharpened point 34. Point 34 ruptures the end seal of gas cartridge 25 so as to release the gas stored therein. It will also be observed that plunger 33 has grooves, two shown at 35, adjacent sharpened end 34. Resilient O-rings 36 are mounted in grooves 35 and carried thereby. Of course, the purpose of grooves 35 and O-rings 36 is to provide a gas tight joint so as to prevent the inflating gas escaping from gas cartridge 35 from passing down bore 32.

Again referring to FIGS. 3 and 4, it will be seen that a driving rod 37 is configured to cooperate with the other end of plunger 38 to move plunger 33 within bore 31. Driving rod 37 may be seen to have an enlarged shoulder 38 extending circumferentially therearound. Driving rod 37, like plunger 33, may be made of a suitable corrosion resistant, high strength material, for example, stainless steel has proven effective in this application.

Figure 6:
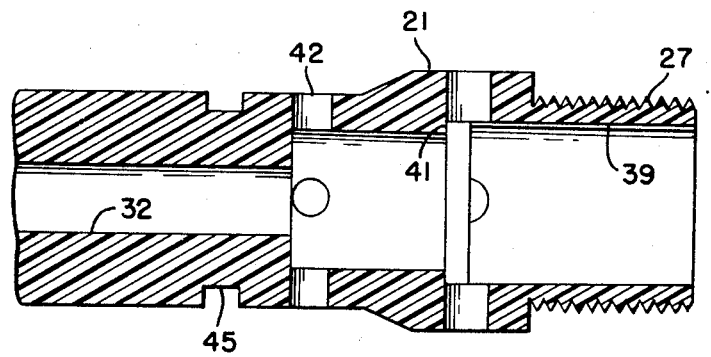
FIG. 6 is a longitudinal sectional view of a body component of the invention.

As may be best seen at FIG. 6, an enlarged sectional view of body member 21, an enlarged bore 39 extends axially down body member 21 so as to concentrically communicate with bore 32. Bore 39 has a shoulder portion 41 which constricts the diameter of enlarged bore 39 slightly but not sufficiently to prevent the passage of enlarged shoulder 38 of driving rod 37 from passing therethrough. A plurality of seawater vents 42 are circumferentially placed about body member 21 and communicate through the sides thereof in the vicinity of shoulder 41 so as to admit seawater.

Referring again to FIGS. 3 and 4, it will be seen that a soluble washer 43 is placed so as to rest on shoulder 41 and abut enlarged shoulder 38 to prevent driving rod 37 from urging plunger 33 against gas cartridge 25. Since washer 43 is soluble in seawater, after a predetermined exposure to seawater, permitted by vents 42, the washer will dissolve or be weakened to the extent that driving rod 37 under the influence of spring 44 will urge plunger 33 forward in bore 32 and rupture gas cartridge 25.

Spring 44, which is of conventional spring steel material, is concentrically placed on the elongated end of driving rod 37 abuts the other side of enlarged shoulder 38 from that engaged by washer 33 and is compressed by the inner end of threaded end cap 23. Spring pressure, washer inside diameter and thickness are varied in order to adjust the device for the desired operational interval.

A common problem encountered in using gas cartridges is the leakage of the gas from the cartridge during long periods of shelf life or in handling the cartridges in bulk. The condition of the individual cartridges may be obtained within the necessary limits of accuracy by weighing the individual cartridges and comparing the weight against a nonstandard. However, in the instant invention, such a weighing would require disassembly and reassembly of the unit. It may therefore be readily appreciated that a method to determine with approximate accuracy the condition of the gas cartridge would be highly desirable. This is accomplished in the instant invention by providing a depression, such as groove 45, in the outer surface of body means 21. This depression which is placed in a predetermined arrangement with respect to the center of gravity of the assembled device provides a balance point on which a device may be rested. For example, the trainer may use a knife blade and rest the device thereon. In dependence on realtive position of depression 45 and the center of gravity, the device will balance or will pivot in one direction or the other in dependence upon the weight of gas cartridge 25. This simple test thereby prevents the installation of units which may be faulty on the marine mammals undergoing training.

MODE OF OPERATION

Referring again to FIGS. 1 and 2, the method of training marine mammals using the device of the invention will be briefly described. Trainer 12 attaches training device 17 to the harness 16 of the marine mammal being trained. The marine mammal then swims to his appointed task such as, for example, placing recovery tool 14 on submerged object 15. When this task, which the animal has been trained to perform in enclosures, has been accomplished, the marine mammal returns to trainer 12 where it receives a suitable reward. At this time, the training device 17 is removed. If the animal remains in the water, it is replaced with a fresh dry device 17.

As the mammal swims through the water, the seawater enters vents 42 so as to saturate soluble washer 43 and commence dissolving the washer. The rate at which soluble washer 43 is dissolved, of course, depends upon the material of which it is made. In the instant invention, magnesium washers have proven satisfactory, however, other soluble materials may be used if desired. The thickness of washer 43 is chosen such that after a predetermined time interval in excess of that needed for the marine mammal to perform his training assignment driving rod 37 is freed and drives plunger 33 forward to exhaust the gas from gas cartridge 25 into fluted balloon 19. When the training device has collapsed, as illustrated in FIG. 2, it affords very little hydrodynamic drag. Further, the device of the invention as illustrated by the exemplary embodiment of FIG. 2, weighs but four-tenths of an ounce in water. Therefore, its presence is scarcely noticed by the marine mammal being trained while it is deflated.

When deflated, the device of the invention offers considerable hydrodynamic drag thereby retarding the swimming ability of the mammal. Further, the device affords sufficient buoyancy but the mammal is unable to remain below the surface for extending periods. With the mammal thus slowed and confined to the surface, trainer 12 may steer inflatable craft 11 alongside the animal and recapture the animal.

As may be readily seen, the device of the invention is a valuable training aid to trainers of marine mammals. The device permits the animal to be worked in the open water at an earlier date than would be possible if the device were not employed. Further, since the trainer removes the inflated device upon recapturing the animal, the use of the device reinforces the reward system of training the animal. The use of the device has proven highly successful and has had profound effect on the training procedures used in training marine mammals.

The foregoing description taken together with the appended claims constitute a disclosure such as to enable persons skilled in the biosciences and general engineering arts and having the benefit of the teachings contained herein to make and practice the invention. Furthermore, the structure and methods of application herein described meet the objects of invention, and generally constitute a meritorious advance in the art unobvious to such artisans not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A training device for marine mammals comprising:
   harness means for encircling the body of said marine mammal;
   gas storage means for containment of a quantity of inflating gas under pressure;
   clasp means effectively secured to said gas source means and configured so as to be releasably secured to said harness means for joining said gas source to said harness means;
   bladder means secured to said gas storage means for selective inflation thereby; and
   timing means effectively connected to said gas storage means and including,
   body means connected to said gas storage means for support thereof,
   gas release means carried within said body means and positioned with respect to said gas storage means for release of the contents thereof, and
   water soluble means carried by said body means positioned to restrain said gas release means from releasing the contents of said gas storage means until a predetermined emersion in water is obtianed,
   whereby, after said predetermined emersion interval, said bladder means may be inflated to provide a device having high hydrodynamic drag and buoyant characteristics attached to said marine mammal so as to make location and recovery of said marine mammal more easily accomplished.

2. A training device according to claim 1 wherein said gas storage means includes a gas filled cartridge which is threadedly received into the body means of said timing means.

3. A training device according to claim 2 wherein said timing means is further characterized by said body means being cylindrical and having said gas filled cartridge threadedly connected to one end thereof and protruding therefrom;
   end cap means affixed to the opposite end of said cylindrical body portion for closure thereof; and
   boss means extending axially outwardly from said cap means for hingedly mounting the aforesaid clasp means thereby providing effective connection between said clasp means and said gas storage means.

4. A training device according to claim 3 wherein said body means further includes:
   enlarged flange means extending around said cylindrical body portion of said timing means and axially spaced from said gas filled cartridge for receiving the aforesaid bladder means thereon with said gas filled cartridge extending within said bladder means; and
   vent means extending through said cylindrical body portion of said timing means intermediate the end thereof mounting said gas filled cartridge means and said enlarged boss means for providing an inflation passage between said gas filled cartridge and said bladder means.

5. A training device according to claim 4 wherein said body means further includes:
   a bore extending axially through the center of said cylindrical body portion of said timing means so as to be in communication with the fitted end of said gas filled cartridge and said vent means for providing a gas passage therebetween; and cylindrical plunger means slidable within said bore and having a pointed end thereon for puncturing the end of said gas filled cartridge and thereby releasing the gas stored therein.

6. A training device according to claim 5 wherein said plunger means includes:
groove means extending circumferentially about said cylindrical plunger means adjacent to but axially spaced from the pointed end thereof for providing a seal mounting structure thereon; and
O-ring seal means mounted in said groove means for forming a gas tight seal between said plunger means and said bore,
whereby the passage of gas down said bore when said gas filled cartridge is punctured by said cylindrical plunger means is prevented.

7. A training device according to claim 6 wherein said timing device further includes:
driving rod means configured to engage said cylindrical plunger means and having an enlarged shoulder thereon for moving said cylindrical plunger axially within said bore; and
an enlarged bore axially communicating with said bore and having a shoulder thereon constricting the diameter of the enlarged bore but still permitting passage of the enlarged shoulder of said driving rod means therethrough.

8. A training device according to claim 7 in which said cylindrical body portion of said timing means is penetrated by seawater vent means to communicate with said enlarged bore in the general area of said shoulder for flooding said enlarged bore with seawater when the training device is emersed therein.

9. A training device according to claim 8 wherein the aforesaid water soluble means further includes:
a washer fitted on the shoulder of said enlarged bore and abutting the shoulder on the aforesaid driving rod means thereby preventing the passage of said driving rod in said enlarged bore so as to urge the aforesaid plunger means into penetrating contact with the aforesaid gas filled cartridge, said washer being made of a material that is soluable in seawater; and the aforesaid timing means includes:
spring means engaging the enlarged shoulder of the aforesaid driving rod and abutting the aforesaid end cap means so as to urge said driving rod to force the aforesaid plunger into penetrating contact with the aforesaid gas filled cartridge,
whereby said bladder means is inflated after a predetermined time within the salt water environment.

10. A training device according to claim 3 in which said cylindrical body means has a balancing depression in the exterior thereof in a predetermined relation to the center of gravity of the timing device with a gas filled cartridge and bladder properly installed thereon.

11. A method of training marine mammals comprising the steps of:
fitting a harness to said marine mammal;
attaching a drag-flotation device to said harness which includes a water soluble timing means controlling a gas release mechanism which actutes after a predetermined laps of time to increase the hydrodynamic drag and buoyancy of said marine mammal;
working with the marine mammal in the water such as to cause the marine mammal to return to the trainer at frequent intervals; and
replacing the attached drag-flotation device when the marine mammal returns to the trainer with another similar unit,
whereby if the marine mammal does not return to the trainer within said predetermined time interval its swimming ability is impaired to facilitate recapture.

* * * * *